US012631281B2

(12) United States Patent
Kamiyama et al.

(10) Patent No.: US 12,631,281 B2
(45) Date of Patent: May 19, 2026

(54) PIPE REHABILITATION METHOD

(71) Applicant: SHONAN GOSEI-JUSHI SEISAKUSHO K.K., Hiratsuka (JP)

(72) Inventors: Takao Kamiyama, Hiratsuka (JP); Makoto Ishida, Hiratsuka (JP)

(73) Assignee: SHONAN GOSEI-JUSHI SEISAKUSHO K.K., Hiratsuka (JP)

( * ) Notice: Subject to any disclaimer, the term of this patent is extended or adjusted under 35 U.S.C. 154(b) by 585 days.

(21) Appl. No.: 18/037,231

(22) PCT Filed: Sep. 30, 2021

(86) PCT No.: PCT/JP2021/036030
§ 371 (c)(1),
(2) Date: Oct. 23, 2023

(87) PCT Pub. No.: WO2022/107457
PCT Pub. Date: May 27, 2022

(65) Prior Publication Data
US 2024/0240740 A1     Jul. 18, 2024

(30) Foreign Application Priority Data
Nov. 18, 2020     (JP) ................................. 2020-191966

(51) Int. Cl.
*F16L 55/1645* (2006.01)
*F16B 37/14* (2006.01)
(Continued)

(52) U.S. Cl.
CPC ............ *F16L 55/165* (2013.01); *F16B 37/14* (2013.01); *F16L 9/22* (2013.01); *F16L 55/162* (2013.01);
(Continued)

(58) Field of Classification Search
CPC ... F16L 55/163; F16L 55/1657; F16L 55/162; F16L 55/165; F16L 55/18; F16L 1/036;
(Continued)

(56) References Cited

U.S. PATENT DOCUMENTS 8,240,339 B2 * 8/2012 Kamiyama ............... E03F 3/06
                                              405/184.2
8,360,684 B2 * 1/2013 Kamiyama ............... F16L 9/22
                                              405/153
(Continued)

FOREIGN PATENT DOCUMENTS

JP          01-123947 U       6/1991
JP          H10-068293 A      3/1998
(Continued)

OTHER PUBLICATIONS

JP 5065964 English Translation (Year: 2025).*
International Search Report for PCT/JP2021/036030 dated Dec. 14, 2021.

*Primary Examiner* — Dominick L Plakkoottam
(74) *Attorney, Agent, or Firm* — MOSER TABOADA

(57) ABSTRACT

Segments each having side plates 102 and 103 and a plurality of inner plates 106 and 107 inside the side plates are coupled in the circumferential direction and in the longitudinal direction to construct a rehabilitation pipe inside an existing pipe. A plastic nut retainer 50 for retaining therein a nut 60 engaged with a coupling bolt 11 is attached between the side plate 102 on one side of the segment 1b and the inner plate 106 adjacent thereto. The coupling bolt is screwed into the nut to couple the segments 1a and 1b in the longitudinal direction due to clamping by screwing. A groove is formed in the nut retainer, and the nut is press-fitted into the groove and retained in the nut retainer.

7 Claims, 18 Drawing Sheets

(51) Int. Cl.

| | | |
|---|---|---|
| *F16L 9/22* | (2006.01) | |
| *F16L 55/162* | (2006.01) | |
| *F16L 55/165* | (2006.01) | |
| *F16L 55/163* | (2006.01) | |

(52) U.S. Cl.
CPC ....... F16L 55/1645 (2013.01); F16L 55/1657 (2013.01); *F16L 55/163* (2013.01)

(58) Field of Classification Search
CPC ... F16L 1/038; F16L 51/00; F16L 9/22; F16B 37/14; F16B 5/065
See application file for complete search history.

(56) References Cited

U.S. PATENT DOCUMENTS

| | | | | |
|---|---|---|---|---|
| 8,568,060 | B2 * | 10/2013 | Kamiyama | ............... F16L 9/22 |
| | | | | 405/184.2 |
| 9,194,528 | B2 * | 11/2015 | Kamiyama | ........... F16L 55/162 |
| 9,797,539 | B1 * | 10/2017 | Kamiyama | ........... F16L 55/165 |

| | | | | |
|---|---|---|---|---|
| 2005/0205148 | A1 * | 9/2005 | Miura | ................... F16L 55/163 |
| | | | | 138/98 |
| 2005/0225088 | A1 * | 10/2005 | Kamiyama | ............... E03F 3/06 |
| | | | | 285/412 |
| 2005/0248157 | A1 * | 11/2005 | Kaneta | ............. F16L 55/16455 |
| | | | | 285/406 |
| 2013/0263957 | A1 * | 10/2013 | Kamiyama | ........... F16L 55/163 |
| | | | | 138/99 |
| 2014/0097612 | A1 * | 4/2014 | Kamiyama | ........... F16L 55/165 |
| | | | | 285/15 |
| 2016/0273699 | A1 * | 9/2016 | Kamiyama | ............. F16L 55/18 |
| 2017/0016568 | A1 * | 1/2017 | Kamiyama | ........ F16L 55/1657 |
| 2019/0032835 | A1 * | 1/2019 | Chang | ............. F16L 55/16455 |

FOREIGN PATENT DOCUMENTS

| | | | |
|---|---|---|---|
| JP | | 2005-299711 A | 10/2005 |
| JP | | 2009-243531 A | 10/2009 |
| JP | | 2011-012803 A | 1/2011 |
| JP | | 5065964 B2 * | 11/2012 |
| KR | 10-2006-0023504 A | | 3/2006 |
| WO | WO 2016/088168 A1 | | 6/2016 |

* cited by examiner

PIPE REHABILITATION METHOD

TECHNICAL FIELD

The present invention relates to a pipe rehabilitation method for installing a rehabilitation pipe inside an existing pipe in which segments are coupled in the circumferential direction and in the longitudinal direction, each of the segments being formed integrally from a plastic material and comprising an inner surface plate constituting an inner circumferential surface and side plates and end plates provided upright on peripheral edges of the inner surface plate.

BACKGROUND ART

In cases in which a pipeline such as a sewage pipe buried underground has deteriorated through aging, a pipe lining method has been proposed and practiced in which a lining is provided to the inner circumferential surface thereof to repair the pipeline without excavating it from the ground.

In cases in which large-diameter pipelines are to be rehabilitated, segments are used each of which comprises an inner surface plate constituting an inner circumferential surface, and side plates and end plates provided upright on the peripheral edges of the inner surface plate, these plates being integrally formed from a plastic material. The segments are coupled in the circumferential direction to assemble a pipe unit. The pipe units are coupled in the longitudinal direction using a coupling bolt to assemble a rehabilitation pipe inside an existing pipe.

Patent Document 1 below discloses a configuration in which long coupling bolts that longitudinally extend between both side plates of the segment are used, the coupling bolts being fixed to the segments and coupled to each other to couple the segments in longitudinal direction.

Patent Document 2 below describes a configuration in which a nut is fixed to one segment, and a coupling bolt is passed through the other segment and screwed into the nut fixed to the one segment, thereby coupling both the segments in the longitudinal direction.

PRIOR ART DOCUMENTS

Patent Documents

Patent Document 1: JP 2005-299711 A
Patent Document 2: JP 2011-012803 A

SUMMARY OF INVENTION

Problems to be Solved

In the segment coupling method as described in Patent Document 1, the coupling bolts are linked to each other in the longitudinal direction. This provides a long rod-shaped member that couples the segments in the longitudinal direction. Therefore, the segment portions where the coupling bolts are provided a firmly joined, but the portions where the coupling bolts are not provided cannot be joined in longitudinal direction with sufficient strength.

On the other hand, in the segment coupling method as described in Patent Document 2, the nuts are staggered fox fixation in the circumferential direction, so that the coupling bolts are disposed in a zigzag manner, allowing the segments to be joined with sufficient strength. However, the nut is so long as to extend between the side plate of the segment and the inner plate adjacent thereto. Therefore, it is necessary to form a threaded portion that engages with the threaded portion of the coupling bolt over the entire internal length of the long nut. This disadvantageously requires an expensive nut.

In addition, the nut described in Patent Document 2 is long in the longitudinal direction, so that it must be fixed by bolting one end of the nut to the inner plate adjacent to the side plate of the segment. Therefore, a dedicated tool with torque control is required for nut installation. Furthermore, it is necessary to loosen the bolts and re-attach the nut to the correct position when the out is installed in wrong position. This disadvantageously requires time for replacement work.

The present invention has been made to solve such problems, and an object thereof is to provide a pipe rehabilitation method capable of inexpensively coupling segments in the longitudinal direction.

Means for Solving the Problems re sent invention provides a pipe rehabilitation method in which segments are coupled in the circumferential direction and in the longitudinal direction to install a rehabilitation pipe inside an existing pipe, each of the segments having an inner surface plate, side plates provided upright on both sides of the inner surface plate and a plurality of inner plates provided upright on the upper surface of the inner surface plate inside the side plates, the method comprising:

attaching between the side plate of one segment and the inner place adjacent to the side plate a plastic nut retainer that retains a nut inside and has a hollow portion through which a coupling bolt passes to screw into the nut;

aligning the one segment with the other segment coupled to the one segment in the longitudinal direction; and screwing the coupling bolt into the nut to couple the one segment with the other segment in the longitudinal direction, wherein the nut retainer is provide with a groove that extends in a direction perpendicular to the hollow portion, the nut being press-fitted into the groove and retained in the nut retainer.

Effect of the Invention

According to the present invention, the nut is retained inside the nut retain ex attached between the side plate on one side of the segment and the inner plate adjacent to the side plate, so that the length of the nut in the longitudinal direction can be made smaller than the distance bet be side plate and the inner plate adjacent there to, making it possible to use a small and inexpensive nut. The nut is press-fitted into the groove inexpensive formed in the nut retainer, so that the nut can be securely and easily attached, and the nut retainer can also be easily attached or detached. This advantageously makes it easy to redo even if the nut is attached in wrong position.

Figure 4A:
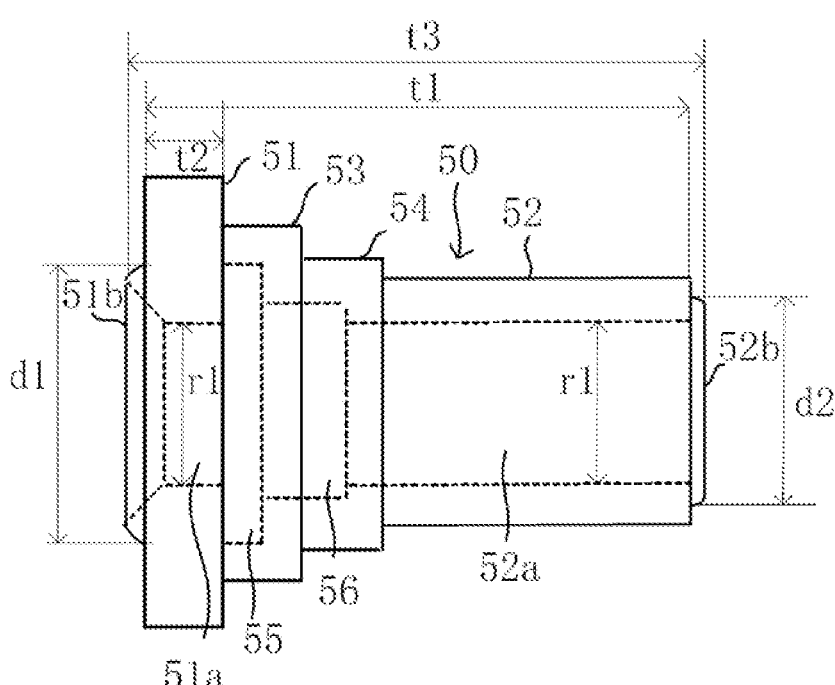
Figure 4B:
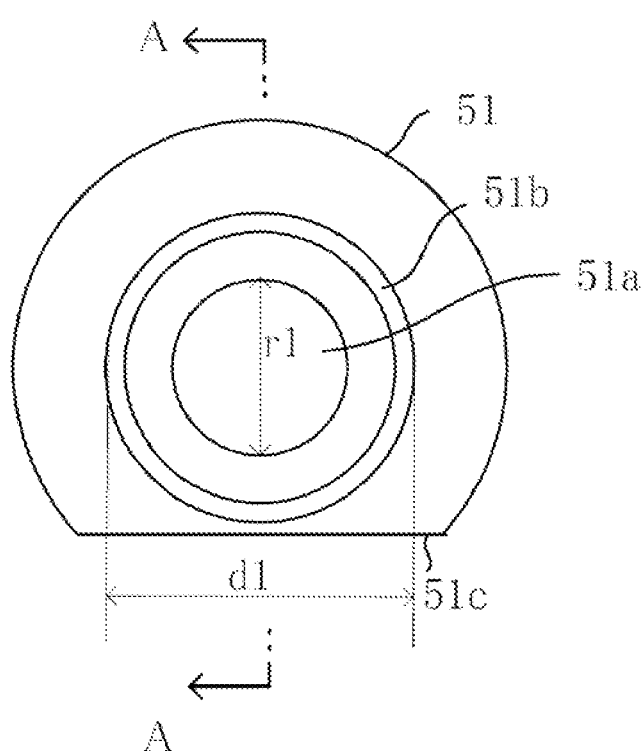
Figure 4C:
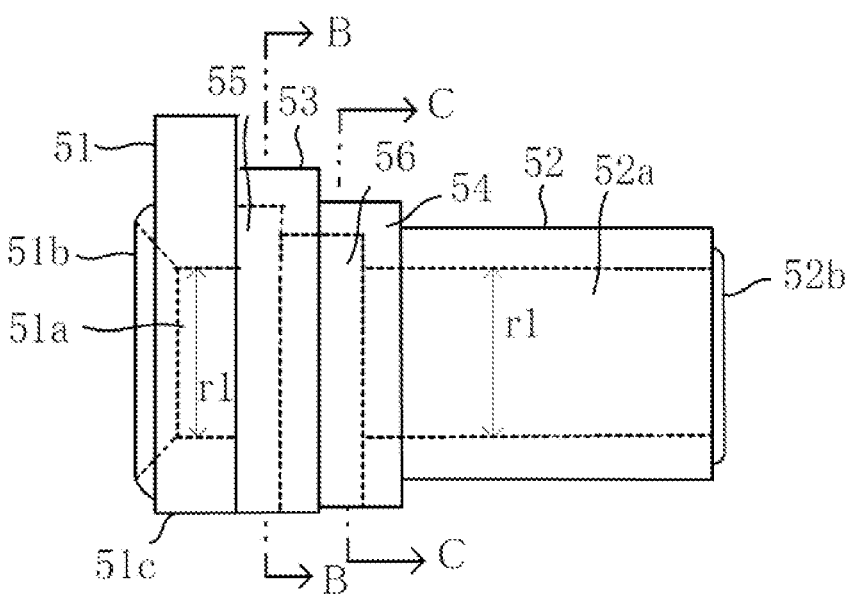
Figure 5A:
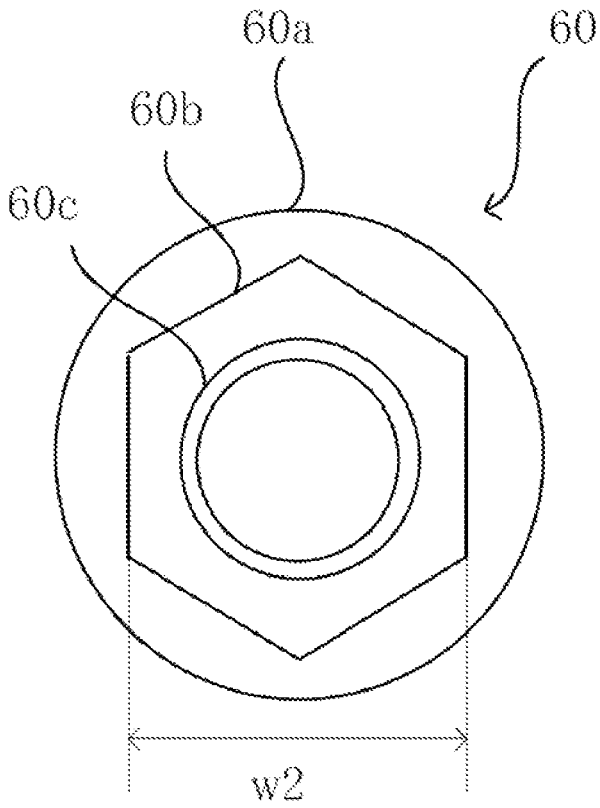
Figure 5B:
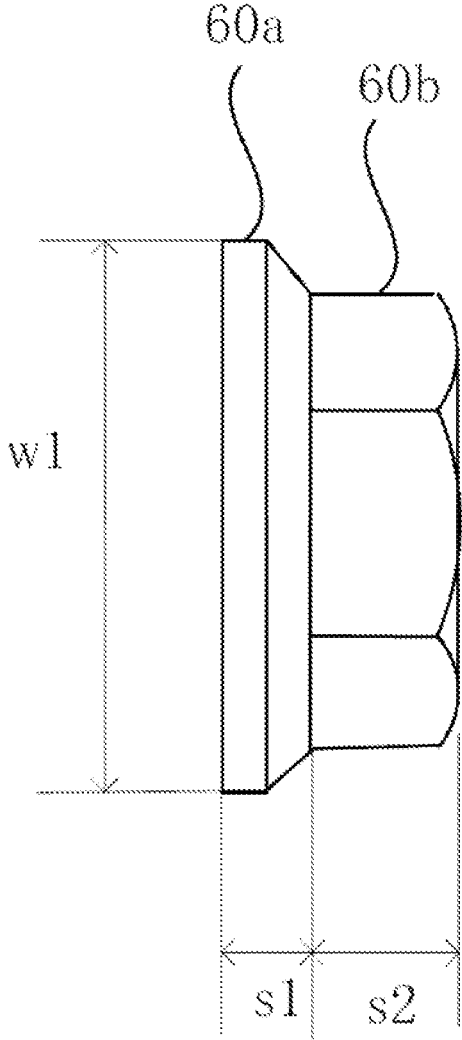
Figure 6A:
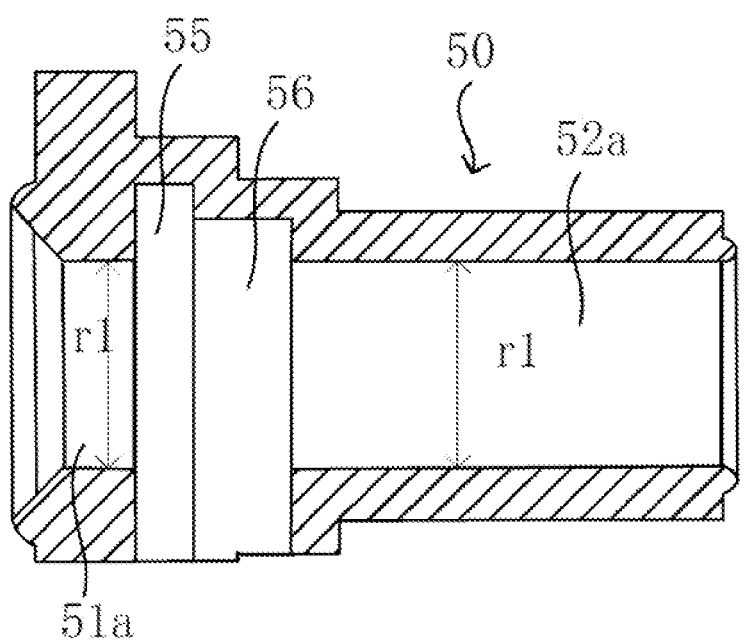
Figure 6B:
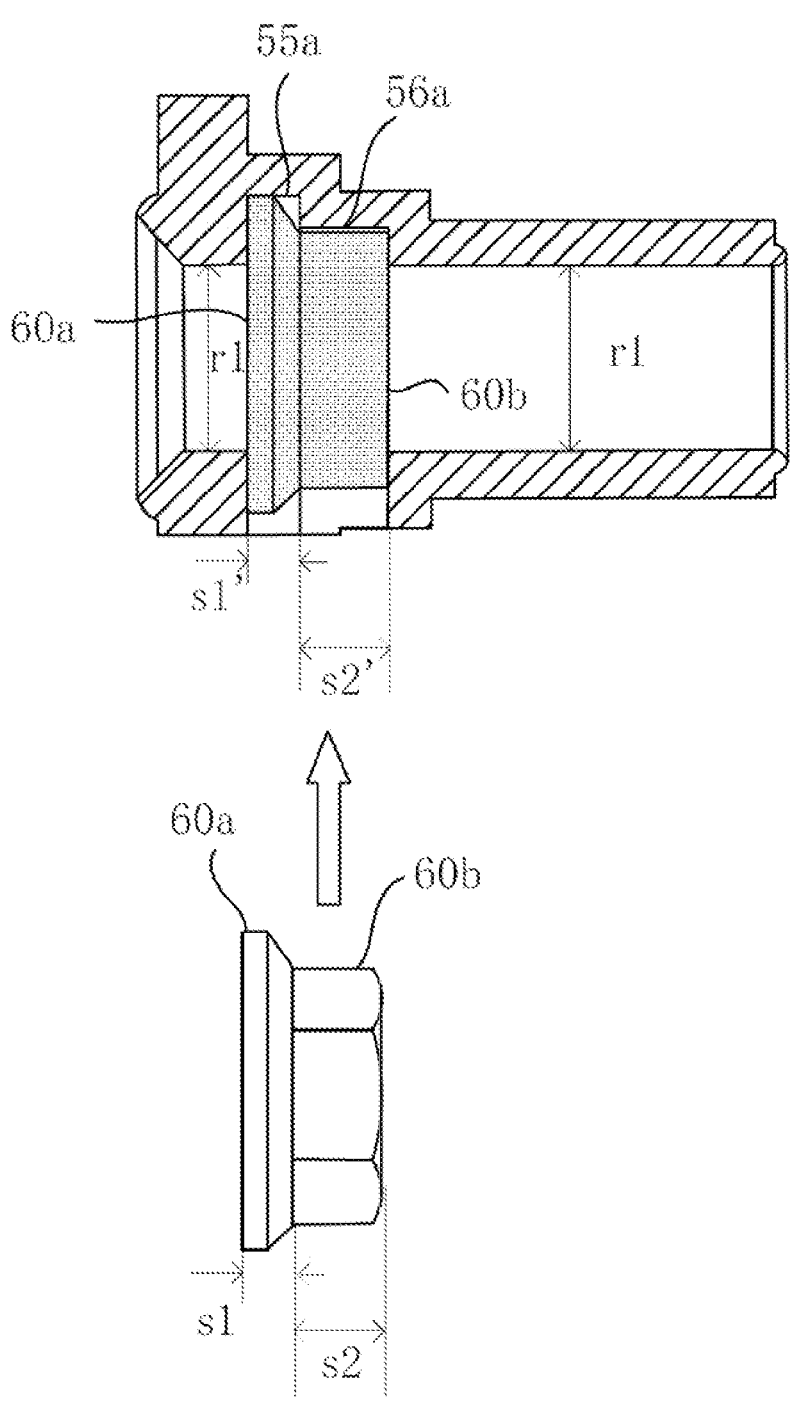
Figure 7A:
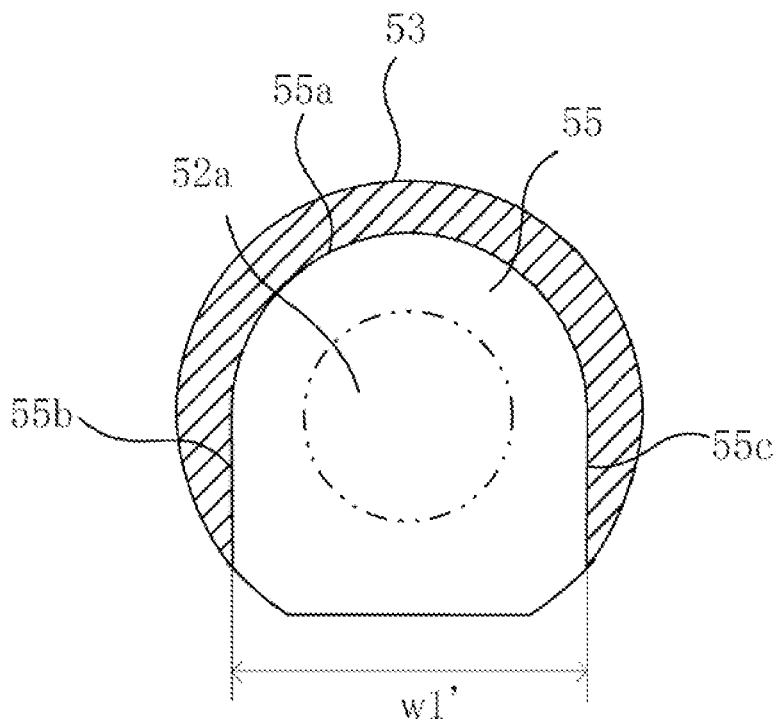
Figure 7B:
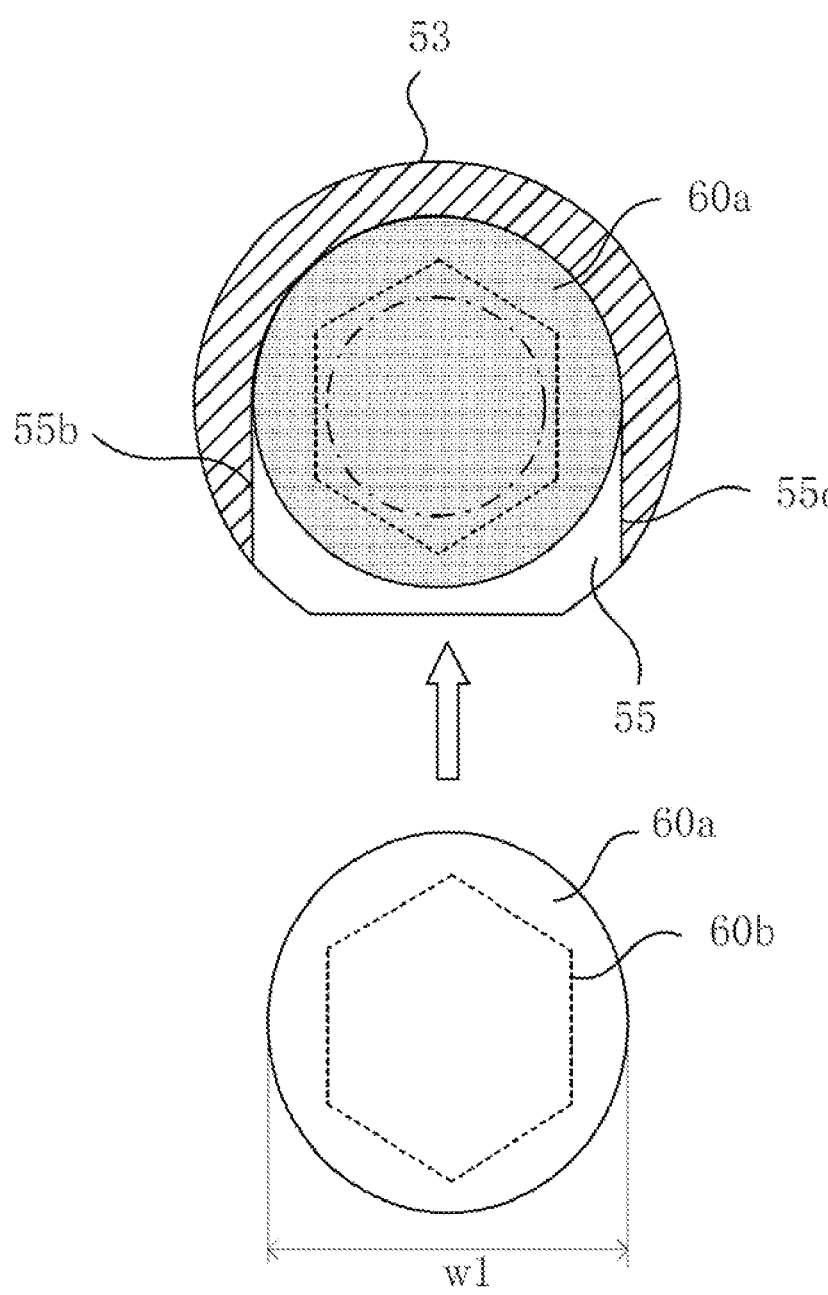
Figure 8A:
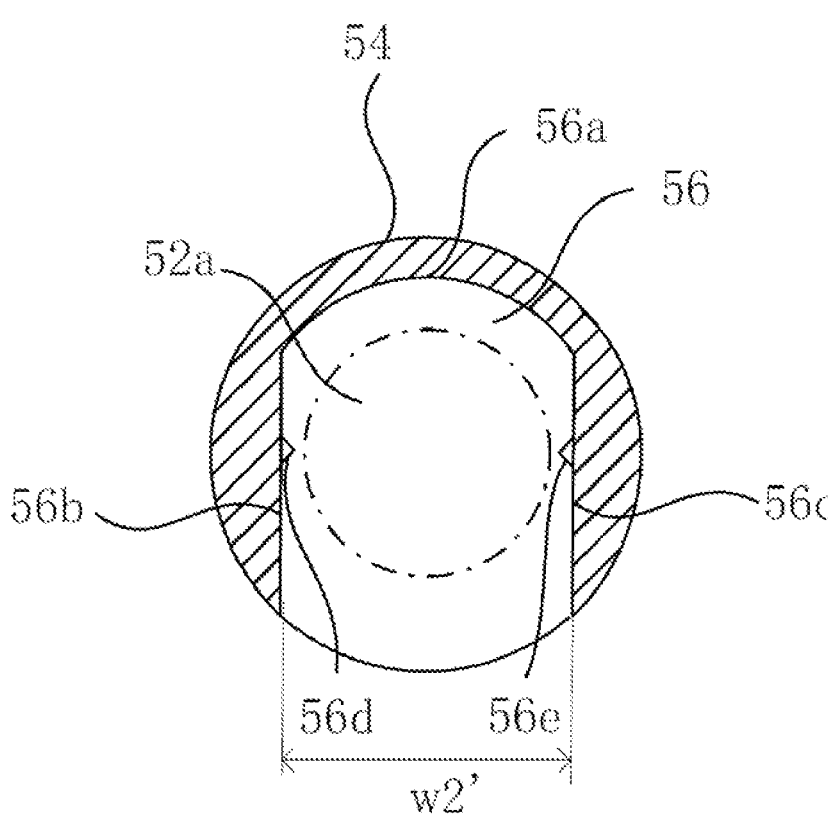
Figure 8B:
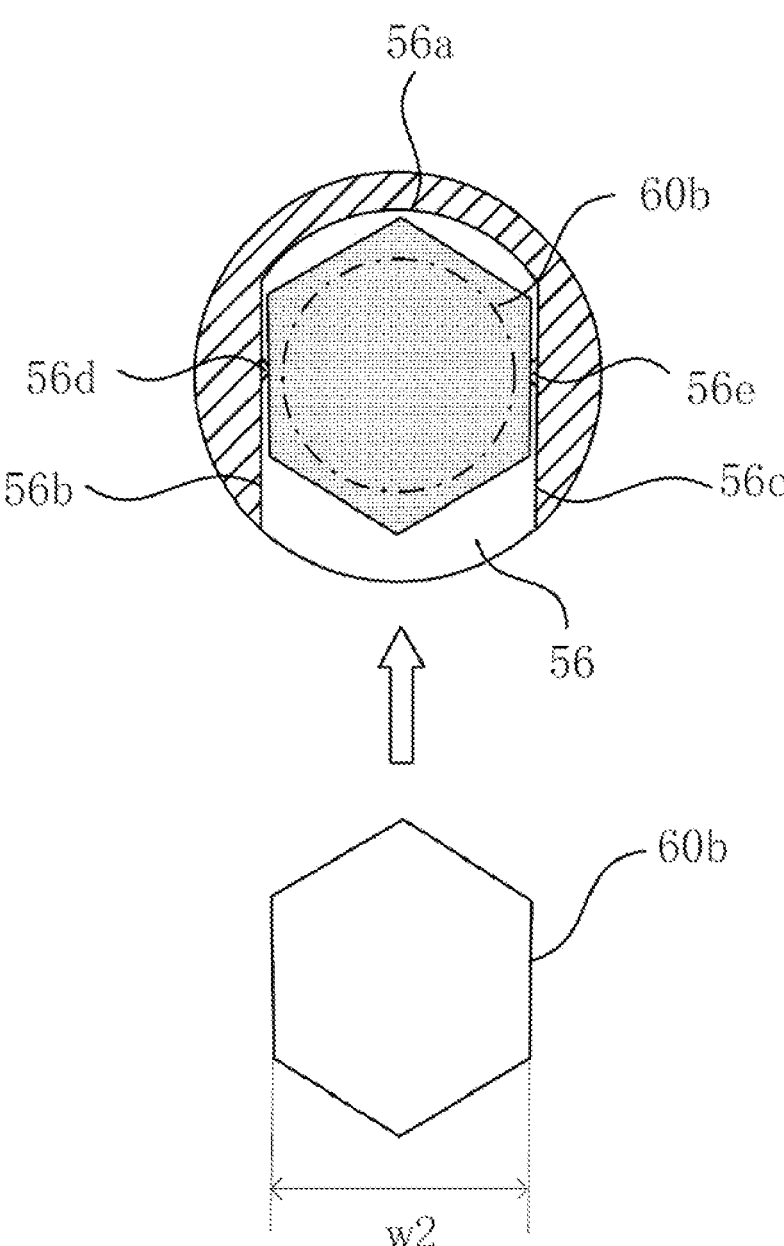
Figure 9:
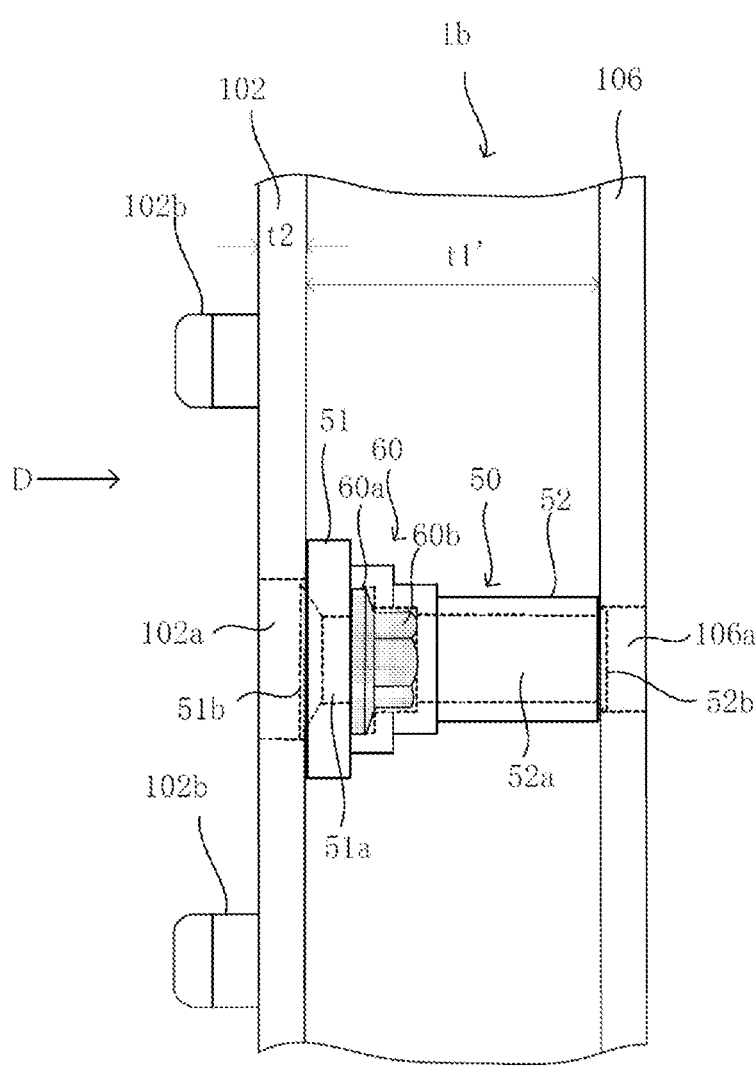
Figure 10:
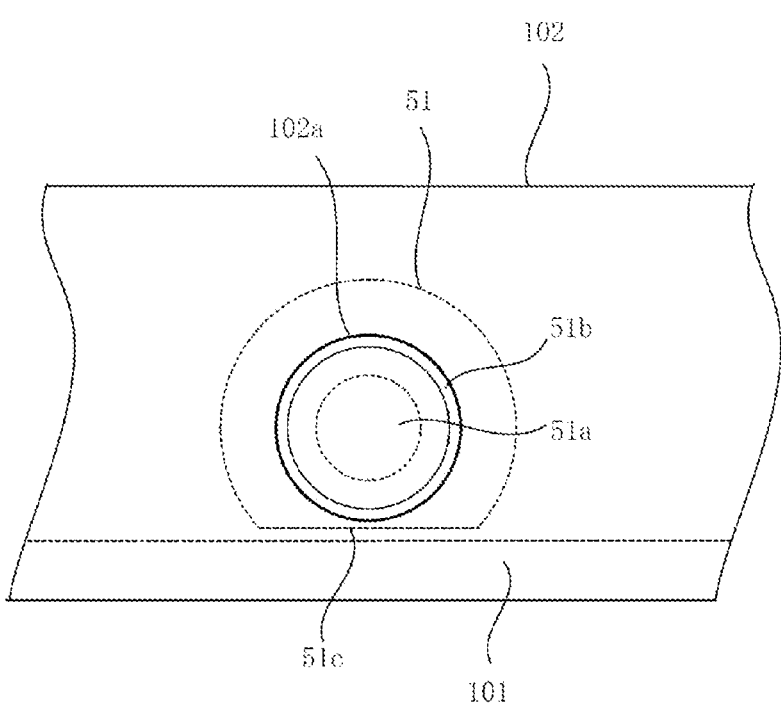
Figure 11:
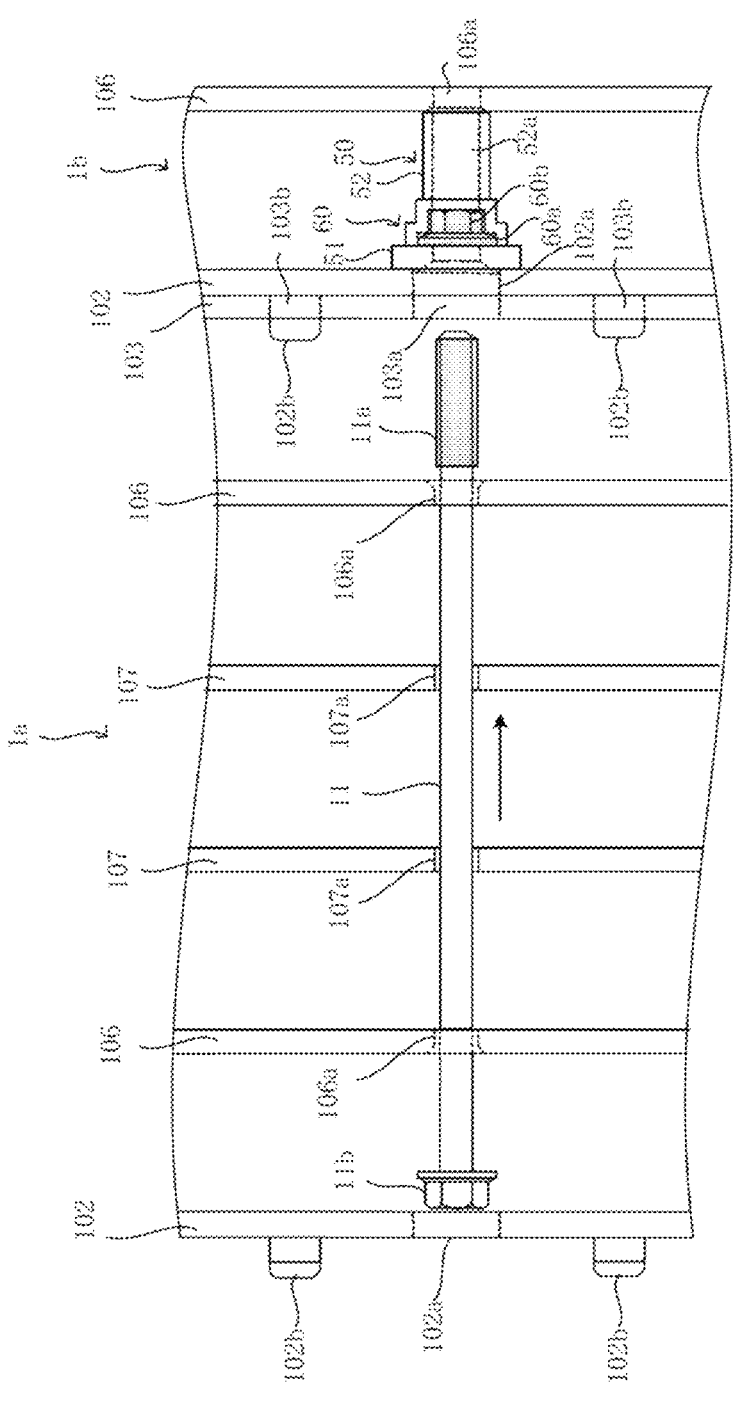
Figure 12:
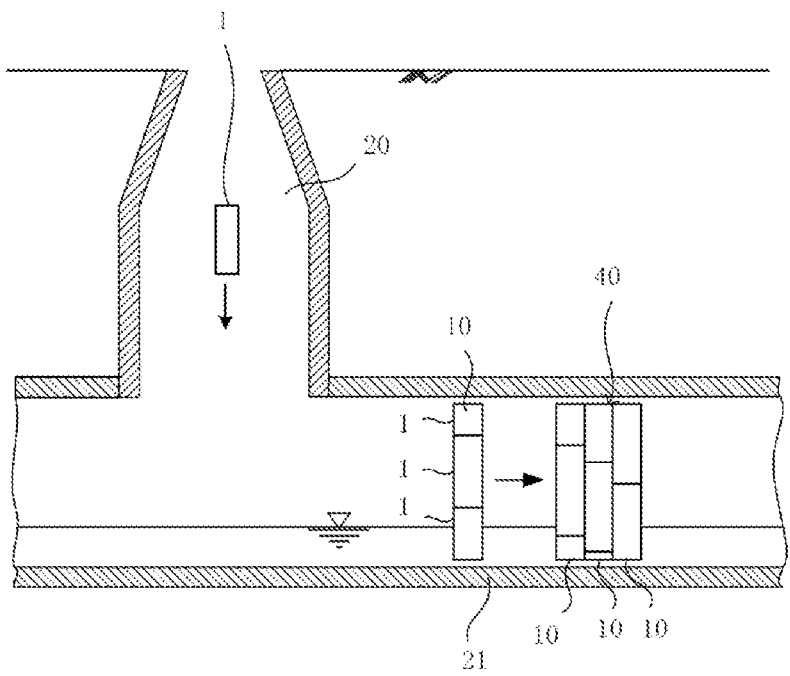

FIG. da is a top view of a nut retainer used for coupling the segments in the longitudinal direction;

FIG. 4b is a front view of a nut retainer used for coupling the segments in the longitudinal direction;

FIG. 4c is a side view of a nut retainer used for coupling the segments in the longitudinal direction;

FIG. 5a is a front view of a nut used for coupling the segments in the longitudinal direction;

FIG. 5b is a side view of a nut used for coupling the segments in the longitudinal direction;

FIG. 6a is a cross-sectional view along line A-A of FIG. 4b;

FIG. 6b is an illustrative view showing a state in which the nut is inserted into the nut retainer;

FIG. 7a is a cross-sectional view along line B-B of FIG. 4c;

FIG. 7b is an illustrative view showing a state in which the flange portion of the nut is inserted into the nut retainer;

FIG. 8a is a cross-sectional view along line C-C of FIG. 40;

FIG. 8b is an illustrative view showing a state in which the hexagonal portion of the nut is inserted into the nut retainer;

FIG. 9 is an illustrative view showing a state in which the nut retainer is attached to the segment;

FIG. 10 is a front view of the segment as viewed from arrow D of FIG. 9;

FIG. 11 is an illustrative view showing a state in which a coupling bolt and the nut retainer are used to couple the segments in longitudinal direction; and FIG. 12 is an illustrative view showing a state in which a pipe unit is assembled to install a rehabilitation pipe inside an existing pipe.

MODE OF CARRYING OUT THE INVENTION

The present invention will now be described with references to embodiments illustrated in the accompanying drawings. The present invention is suitable for rehabilitating or repairing large-diameter existing pipes such as sewage pipes, water supply pipes, tunnels, or agricultural irrigation channels. In the present embodiment, the rehabilitation pipes are described as having a circular is-section profile perpendicular to the longitudinal direction. However, it shall be apparent that the present invent on ca be applied to rehabilitation pipe having a square ox another non-circular shape. Also, in addition to shapes in which the cross-section file is closed as a pipe, a horseshoe-shape, a semi-circular shape, a U-shape the like in which one side is open can also be considered to be a pipe, and the present invention can also be applied thereto.

Figure 2:
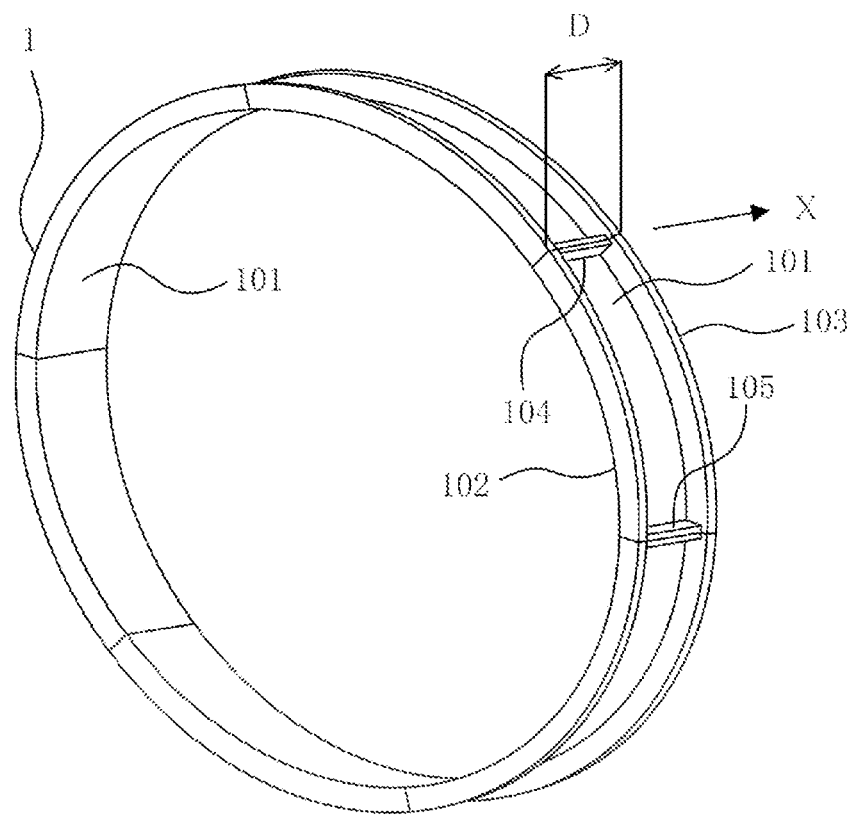
FIG. 2 is a perspective view showing a state in which the segments are coupled in the circumferential direction to assemble a pipe unit.

In the present specifications, the longitudinal direction refers to the direction indicated by arrow X extending in the pipe-length direction of a pipe unit 10 in FIG. 2, and the circumferential direction refers to the direction of the circumference of the circle forming the pipe unit 10.

Figure 1:
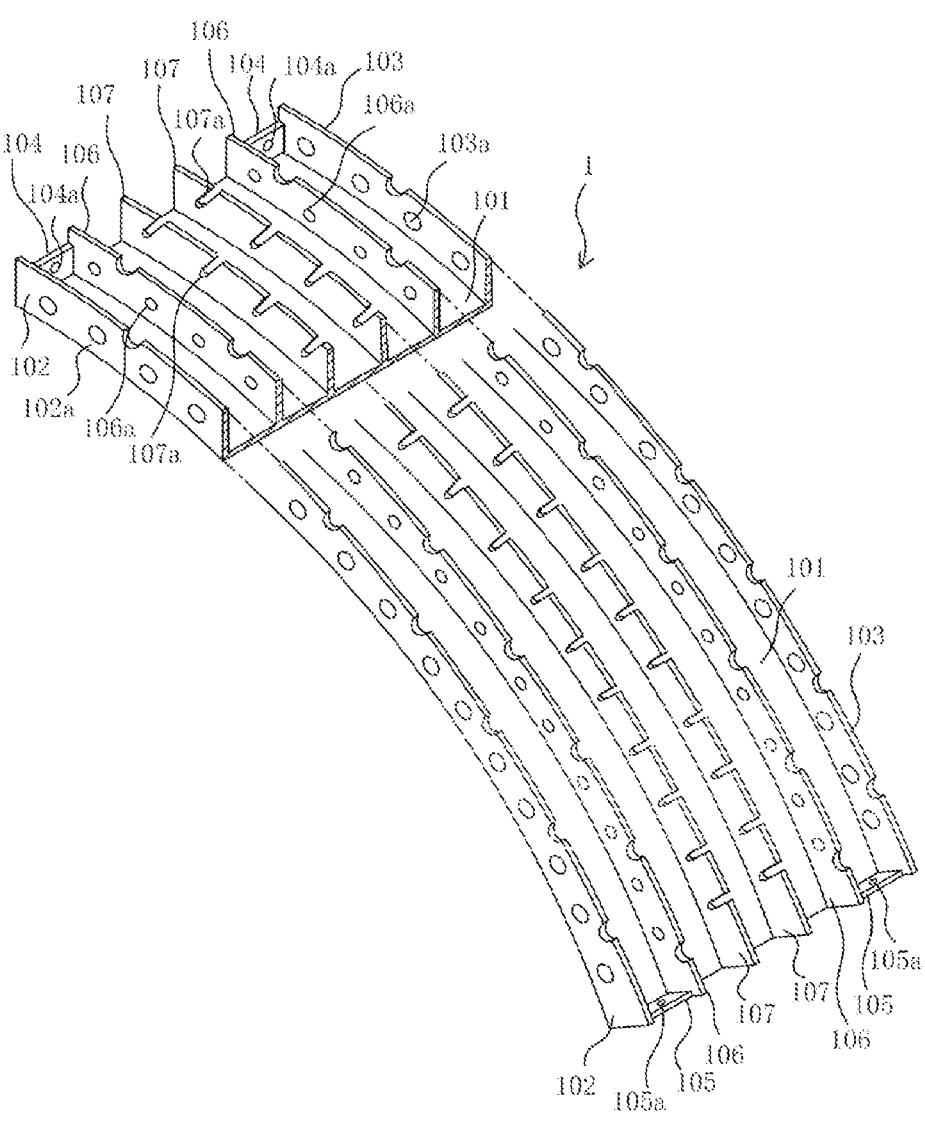
FIG. 1 is a perspective view showing the structure of a segment used in assembling a rehabilitation pipe.

FIG. 1 shows the structure of a segment 1 for a rehabilitation pipe (hereafter simply referred to as "segment"). The segment 1 is an integrally formed block-shaped member made from a plastic material, comprising an inner surface plate 101 constituting an inner circumferential surface of the rehabilitation pipe, side plates 102, 103 with the same thickness provided vertically upright on both sides extending in the circumferential direction of the inner surface plate 101, and end plates 104, 105 provided vertically upright on both ends extending in the longitudinal direction of the inner surface plate 101.

In order to reinforce the mechanical strength of the segment 1, a plurality of inner plates 106, 107 having a shape similar to and the same thickness as the side places 102, 103 are provided upright at equal intervals and parallel thereto on the upper surface of the inner surface place 101 inside the side plates 102, 103.

The segment 1 has a shape that is curved as an are representing a predetermined angle that equally divides the circumference, e.g., a 60° are that divides the circumference into sixths. However, the segment may be shaped as, e.g., a cuboid or a shape that is bent so as to have a curved right angle depending on the cross-section profile or the size of the existing pipe or the location of the existing pipe to be repaired.

In order to couple the segments 1 in the longitudinal direction, a plurality of circular insertion holes 102a, 103a for admitting insertion of a coupling bolt 11 (FIG. 3) are provided at equal intervals along the circumference on the side plates 102, 103. A plurality of circular insertion holes 106a smaller in diameter than the insertion holes 102a, 103a for admitting insertion of the coupling bolt 11 are also provided at equal intervals on the inner plate 106. A plurality of notches 107a are provided at equal intervals on the inner plate 107 to provide a function as an insertion hole through which the coupling bolt can pass. The insertion holes 102a, 103a, 106a and the notches 107a are located at coinciding positions along the circumferential direction.

The end plates 104 and 105 are members disposed between the side plates 102 and 103. A plurality of circular insertion holes 104a and 105a are provided on the end plates 104 and 105 for admitting insertion of coupling bolts co couple the segments 1 in the circumferential direction.

The end plate 105 of the segment 1 is aligned with and brought into contact with the end plate 104 of another segment. A bolt 6 and a nut 7 (FIG. 3) are positioned in the insertion holes 104a and 105a and screwed together to couple the segments in the circumferential direction.

By sequentially coupling the segments in the circumferential direction around the full circumference, it is possible to assemble a ring-shaped pipe unit 10 having a predetermined length D in the longitudinal direction X as shown in FIG. 2. The outside diameter of the pipe unit 10 is slightly smaller than the inside diameter of the existing pipe to be rehabilitated. In FIG. 2, the inner surface plate 101, the side plates 102, 103, and the end plates 104, 105, which are the principal structural members of the segment 1, re shown. In order to prevent the drawing from becoming complicated, the inner plates 106, 107 and other reinforcement structures are not shown.

Figure 3:
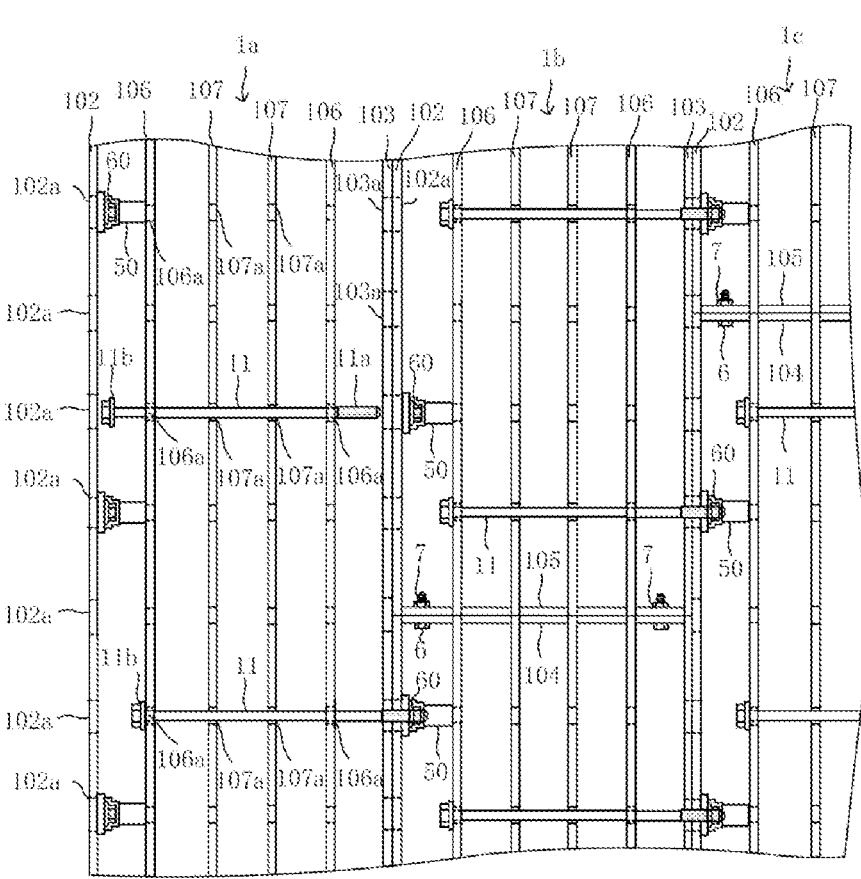
FIG. 3 is a perspective view showing a state in which the segments are coupled in the longitudinal direction.

Such pipe units 10 are sequentially coupled in the longitudinal direction as shown in FIG. 3. In FIG. 3, a plurality of plastic nut retainers 50 for retaining nuts 60 as shown in FIGS. 5a and 5b are attached between the side plates 102 of the segments 1a, 1b, 1c of the pipe units and the inner plates 106 adjacent to the side plates 102. The segments 1a, 1b, 1c are coupled in the longitudinal direction by passing the coupling bolt 11 through the insertion holes 102a, 103a, 106a formed in the side plates 102, 103, and the inner plate 106 and the notches 107a formed in the inner plates 107 of the segments and by screwing it into the nut 60 retained in the nut retainer 50.

As shown in FIGS. 4a, 4b and 4c, the nut retainer 50 has a longitudinal length t1 corresponding to the distance t1' (FIG. 9) between the side plate 102 of the segment and the inner plate 106 adjacent thereto, and it is provided at one end with a hollow cylindrical portion 51, at the other end with a hollow cylindrical portion 52 and with cylindrical portions 53 and 54 having grooves 55, 56 into which the nut 60 is press-fitted. The cylindrical portions 51 and 52 coaxial hollow portions 51*a* and 52*a* each having a diameter r1 through which the coupling bolt 11 can be passed. The hollow portions 51*a* and 52*a* communicate with each other through the grooves 55 and 56 of the cylindrical portions 53 and 54, so that continuous hollow portions are formed in the nut retainer 50.

The longitudinal length t2 of the cylindrical portion 51 is set to be substantially the same as the plate thickness of the side plates 102, 103 and the inner plates 106, 107 of the segments, and the longitudinal lengths of the cylindrical portions 53, 54 are set to be substantially the same as the longitudinal length of the cylindrical portion 51. The cylindrical portions 51 and 53 have diameters larger than those of the other cylindrical portions 52 and 54, so that, when the nut retainer 50 is attached between the side plate 102 and the inner plate 106, the bottom portions of the cylindrical portions 51 and 53 hit the portion of the inner surface plate 101. Therefore, the bottom portions are cut to provide horizontal surface 51*c* (see also FIG. 10).

A ring-shaped protrusion 51*b* is formed on the outer surface (the surface facing the side place 102) of the cylindrical portion 51, having an outer diameter d1 of such a size that it can be fitted into the insertion holes 102*a* and 103*a* formed in the side plates 102 and 103. A ring-shaped protrusion 52*b* is formed on the outer surface (the surface facing the inner plate 106) of the cylindrical portion 52, having an outer diameter d2 of such a size that it can be fitted into the insertion hole 106*a* formed in the inner plate 106.

The longitudinal length t3 of the nut retainer 50 including the protrusions 51*b* and 52*b* is such that the out retainer 50 can be press-fitted between the side plate 102 of the segment and the inner plate 106 adjacent thereto. When the nut retainer 50 is press-fitted and attached between the side plate 102 and the inner plate 106, the protrusions 51*b*, 52*b* are fitted into the insertion hole 102*a* of the side plate 102 and the insertion hole 106*a* of the inner place 106, thereby preventing the nut retainer 50 from falling out of the segment. Note that only one of the protrusions 51*b* and 52*b* can be provided.

As shown in FIGS. 5*a* and 5*b*, the nut 60 press-fitted into the nut retainer 50 is configured as a flange nut having a circular flange portion 60*a* with a diameter of w1 and a hexagonal nut portion 60*b* fixed thereto with a distance of w2 between two facing surfaces. The diameter w1 of the flange portion 60*a* is larger than the diameters of the insertion holes 102*a* and 103*a* of the side plates 102 and 103 so that the nut 60 can be prevented from slipping out of the insertion holes 102*a* and 103*a*. The flange portion 60*a* and the hexagonal nut portion 60*b* have lengths s1 and s2 in the nut height direction, respectively. A threaded portion 60*c* that engages with threaded portion 11*a* of the coupling bolt 11 is formed inside the hexagonal nut portion 60*b*.

The cylindrical portion 53 of the nut retainer 50 is provided with the groove 55 which extends in a direction orthogonal to the hollow portions 51*a* and 52*a* and into which the flange portion 60*a* of the nut 60 is press-fitted. As shown in FIG. 6*b*, the groove 55 has in the longitudinal direction (the direction along which the nut retainer 50 extends) a length s1' corresponding to the length s1 of the flange portion 60*a*. As shown in FIG. 7*a*, the groove 55 has at its upper portion an arcuate surface 55*a* corresponding to the circular shape of the flange portion 60*a*. Both sides of the groove 55 have vertical wall surfaces 55*b* and 55*c* so that the flange port 60*a* can ins ted from the opened lower portion. The groove 55 continues to the cylindrical portion 51 and is formed in the longitudinal direction, so that the groove is formed at a position separated from the outer surface of the cylindrical portion 51 by the thickness t2 of the side plate 102.

The cylindrical portions 53, 54 of the nut retainer 50 are provided with the groove 56 which continues to the groove 55 and extends in a direction orthogonal to the hollow portions 51*a* and 51*a* and into which the hexagonal nut portion 60*b* of the nut 60 is press-fitted. The groove 56 has a longitudinal length s2' corresponding to the length s2 of the hexagonal nut portion 60*b*, and wall surfaces 56*b* and 56*c* (FIGS. 8*a*, 8*b*) are formed which are separated by a distance w2' corresponding to the width w2 of the two facing surfaces of the hexagonal not portion 60*b*. Also, the groove 56 has at its upper portion an arcuate surface 56*a*. The hexagonal nut portion 60*b* is inserted from the opened lower portion of the groove 56 so that its two facing surfaces are positioned between the wall surfaces 56*b* and 56*c*. On the wall surfaces 56*b* and 56*c*, small protrusions 56*d* and 56*e* having a triangular cross ion and extending in the longitudinal direction are formed integrally with the wall surfaces 56*b* and 56*c*.

As shown in FIGS. 7*b* and 8*b*, the flange portion 60*a* and the hexagonal nut portion 60*b* of the nut 60 are inserted from the opened lower portions of the grooves 55 and 56 until the flange portion 60*a* couches the arcuate surface 55*a* of the groove 55. At this time, the nut 60 is coaxial with the hollow portions 51*a* and 62*a* of the nut retainer 50, so that the coupling bolt 11 can be screwed into the not 60. The protrusions 56*d* and 56*e* are formed on the wall surfaces 56*b* and 56*c* of the groove 56 into which the hexagonal nut portion 60*b* is inserted, so that a press-fitting force is required to insert the hexagonal nut portion 60*b*. The press-fitting s the protrusions 56*d* and 56*e* to be crushed, allowing the hexagonal nut portion 60*b* to be prevented from slipping out of the groove 56 due to friction and pressure.

Hard polyvinyl chloride (PVC), which is the same material as the segment 1, is used to integrally form the nut retainer 50 by injection molding. The material is not only hard polyvinyl chloride, but also a resin material such as ABS resin, polypropylene (PP), nylon, and the like that can withstand the strong alkaline component of the filler may be used.

In cases where the segments are coupled in the longitudinal direction using the nut retainer 50 as described above, the nut 60 is press-fitted in advance until the flange portion 60*a* thereof abuts against the arcuate surface 55*a* of the groove 55 of the nut retainer 50 in order to attach the nut 60 to the nut retainer 50. When the nut 60 is press-fitted, the hexagonal nut portion 60*b* crushes the protrusions 56*d* and 56*e* formed in the groove 56, so that the nut 60 can be prevented from slipping out of the grooves 55 and 56 due to the friction and pressure.

Subsequently, the nut retainer 50 into which the nut 60 is press-fitted is, as shown in FIG. 9, press-fitted and attached be the side plate 102 and the inner plate 106 such that the hollow portion 51*a* and the hollow portion 52*a* are aligned with the insertion hole 102*a* of the side plate 102 of the segment 1*b* and the insertion hole 106*a* of the inner plate 106. At this time, as shown in FIG. 10, the protrusion 51*b* of the cylindrical portion 51 fits and enters into the insertion hole 102*a* of the side plate 102. Although not shown, the protrusion 52*b* of the cylindrical portion 52 also fits into the insertion hole 106*a* of the inner plate 106, thereby preventing the nut retainer 50 from falling out of the segment 1*b*.

The nut retainer 50 is attached, e.g., in the factory at a plurality of positions along the circumference of the segment before the segment is transported to the construction site. Thus, ¢ se to which the nut retainers 50 are attached are carried into a manhole 20, as shown in FIG. 12, and coupled in the circumferential direction to assemble the pipe unit 10 as shown in FIG. 2.

Subsequently, the segments of the pipe unit 10 are coupled to the segments of another pipe unit in the longitudinal direction. FIGS. 9 and 11 illustrate the longitudinal coupling of the two segments 1a, 1b.

As shown in FIG. 11, the side plate 102 on one side of the segment 1b to which the nut retainer 50 is attached is aligned with the side plate 103 on the other side of the segment 1a to be coupled to the segment 1b in the longitudinal direction. Projections 102b for alignment are formed on the side plate 102, and, when these projections 102b are fitted into the corresponding holes 103b of the side plate 103, the inner peripheral surfaces of the inner surface plates 101 of the segments 1a and 1b coincide with each other, and the insertion holes 102a and 103a of the side plates 102 and 103 are aligned so that the coupling bolt 11 can pass therethrough. Note that the projections 102b for alignment and the holes 103b are not shown in FIGS. 1 and 3 to avoid complication of the drawings.

Subsequently, the coupling bolt 11 is inserted from the insertion hole 102a of the side place 102 formed in the segment 1a through the insertion holes 106a formed in the internal plates 106, the notches (insertion holes) 107a formed in the internal plate 107, the insertion bole 103a of the side plate 103 of the segment 1a and the insertion hole 102a of the side plate 102 of the segment 1b, and screwed into the nut 60 in the nut retainer 50.

In this embodiment, the coupling bolt 11 is configured as a long bolt. When the coupling bolt 11 is screwed full into the nut 60 until the head portion 11b of the coupling bolt 11a abuts the leftmost inner place 106 adjacent to the side plate 102 of the segment 1a, a sufficient clamping force is generated in the butted side places 102 and 103, thereby allowing both the segments 1a and 1b to be firmly coupled in the longitudinal direction.

In this embodiment, the groove 55 into which the flange portion 60a of the nut 60 is inserted is provided at a position spaced from the side plate 102 of the segment 1b toward the inner plate 106 adjacent to the side plate 102 by a predetermined distance, for example, the thickness t2 of the side plate 102. Therefore, even if a strong clamping force is the segments are coupled, the segments can withstand the clamping force. On both the sides of the groove 56 into which the hexagonal nut portion 60b of the nut 60 is inserted, the wall surfaces 56b and 56c are formed a distance spaced corresponding to the width of the two facing surfaces of the hexagonal nut portion 60b. The hexagonal nut portion 60b is inserted with the two surfaces along the wall surfaces 56b and 56c, so that the nut 60 can be prevented from co-rotating even if the coupling bolt 11 rotates.

FIG. 3 shows a state in which the segments 1c and 1b are already coupled in the longitudinal direction by the coupling bolts 11 and the segment 1a is being coupled to the segment 1b. The lower coupling bolt 11 of the segment 1a has already been screwed into the nut 60 of the segment 1b and the upper coupling bolt 11 will now be screwed into the nut 60 of the segment 1b. This corresponds to the state illustrated in FIG. 11.

The segments of the pipe unit are thus coupled to the segments of the other pipe unit that has already been coupled in the longitudinal direction. This allows the pipe units to be coupled in the longitudinal direction to an arbitrary length and a rehabilitation pipe 40 to be installed inside an existing pipe 21. When the rehabilitation pipe 42 reaches a predetermined length, a filler is injected between the outer circumference of the rehabilitation pipe 42 and the inner wall surface of the existing pipe 21 to integrate the rehabilitation pipe and the existing pipe.

In this embodiment, the nut retainers 50 are attached while being shifted from the adjacent segment in the circumferential direction to provide a zigzag arrangement of the coupling bolts 11, making it possible to couple the segments in the longitudinal direction with sufficient strength. The nut 60 is P s-fitted into the groove formed in the nut retainer 50, so that the nut can be attached reliably and easily. Even if the nut retainer 50 is installed in a wrong position, it can be easily removed by inserting a tool under the nut retainer 50 and lifting it, so that the not retainer 50 can be easily installed in a correct position.

In this embodiment, the nut retainer 50 has a shape in which cylindrical members with different diameters continue, but may have a rectangular parallelepiped shape with a rectangular cross section. Also, the nut is configured as a nut with a flange, but a nut without a flange may be used. The nut retainer 50 is attached such that the open ends of the grooves 55 and 56 into which the nut 60 is inserted fac the upper surface of the inner surface plate 101 of the segment, but it may be attached with the facing direction rotated by 90 degrees, that is, such that they face in a direction along the upper surface of the inner surface plate.

DESCRIPTION OF SYMBOLS

1 segment
10 pipe unit
11 coupling bolt
20 manhole
21 existing pipe
40 rehabilitation pipe
50 nut retainer
51a, 52a hollow portion
55, 56 groove
60 nut
101 inner surface plate
102, 103 side plate
104, 105 end plate
  106, 107 inner plate

The invention claimed is:

1. A pipe rehabilitation method in which segments are coupled in the circumferential direction and in the longitudinal direction to construct a rehabilitation pipe inside an existing pipe, each of the segments having an inner surface plate, side plates provided upright on both sides of the inner surface plate and a plurality of inner plates provided upright on the upper surface of the inner surface plate inside the side plates, the method comprising:

attaching between the side plate of one segment and the inner plate adjacent to the side plate a plastic nut retainer that retains a not inside and has a hollow portion through which a coupling bolt passes to screw into the nut;

aligning the one segment with the other segment coupled to the one segment in the longitudinal direction; and screwing the coupling bolt into the nut to couple the one segment with the other segment in the longitudinal direction, wherein the nut retainer is provided with a groove that extends in a direction perpendicular to the hollow portion, the nut being press-fitted into the groove and retained in the nut retainer.

2. A pipe rehabilitation method according to claim 1, wherein the nut is a flange nut comprising a flange portion and a hexagonal nut portion fixed to the flange portion, and the nut retainer is provided with the groove comprising a first groove into which the flange portion is inserted and a second groove into which the hexagonal nut portion is inserted.

3. A pipe rehabilitation method according to claim 2, wherein the first groove into which the flange portion of the nut is inserted is provided at a position spaced from one end of the nut retainer by a predetermined distance.

4. A pipe rehabilitation method according to claim 2, wherein the second groove into which the hexagonal nut portion of the nut is inserted has a longitudinal length corresponding to the length of the hexagonal nut portion and is provided with wall surfaces spaced apart by a distance corresponding to the width of two facing surfaces of the hexagonal nut portion, the hexagonal nut portion being inserted into the second groove such that the two facing surfaces are positioned between the wall surfaces.

5. A pipe rehabilitation method According to claim 4, wherein a protrusion is formed on one or both the wall surfaces of the second groove into which the hexagonal nut portion is inserted, and then the hexagonal nut portion is inserted into the second groove, the protrusion is crushed, preventing the hexagonal nut portion from falling out of the second groove due to friction with the crushed protrusion.

6. A pipe rehabilitation method according to claim 1, wherein a ring-shaped protrusion that protrudes in the longitudinal direction is formed on a surface of the nut retainer facing the side plate, and the nut retainer is attached such that the protrusion is fitted into an insertion hole formed in the side plate through which the coupling bolt can pass.

7. A pipe rehabilitation method according to claim 1, wherein a ring-shaped protrusion that protrudes in the longitudinal direction is formed on a surface of the nut retainer facing the inner plate, and the nut retainer is attached such that the protrusion is fitted into an insertion hole formed in the inner plate through which the coupling bolt can pass.

* * * * *